(12) United States Patent
Hanson et al.

(10) Patent No.: US 7,885,033 B2
(45) Date of Patent: Feb. 8, 2011

(54) ANTICIPATORY TRACK SWITCHING

(75) Inventors: Reed David Hanson, Chaska, MN (US); Kenneth Arthur Haapala, Plymouth, MN (US); Mark Larry Birtzer, Rosemount, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 63 days.

(21) Appl. No.: 11/937,999

(22) Filed: Nov. 9, 2007

(65) Prior Publication Data

US 2009/0122442 A1 May 14, 2009

(51) Int. Cl.
*G11B 5/55* (2006.01)
(52) U.S. Cl. .................................. 360/78.04
(58) Field of Classification Search ............ None
See application file for complete search history.

(56) References Cited

U.S. PATENT DOCUMENTS

| | | | |
|---|---|---|---|
| 5,291,110 A * | 3/1994 | Andrews et al. ......... | 360/78.06 |
| 5,914,829 A | 6/1999 | Kadlec et al. | |
| 5,974,007 A | 10/1999 | Getreuer | |
| 6,031,684 A | 2/2000 | Gregg | |
| 6,307,705 B1 * | 10/2001 | Anderson et al. ........ | 360/78.04 |
| 6,310,743 B1 * | 10/2001 | Haines et al. ............ | 360/78.07 |
| 6,339,811 B1 * | 1/2002 | Gaertner et al. ............. | 711/112 |
| 6,499,083 B1 | 12/2002 | Hamlin | |
| 6,522,496 B1 * | 2/2003 | Suzuki et al. ............ | 360/78.04 |
| 6,741,529 B1 | 5/2004 | Getreuer | |
| 6,744,590 B2 | 6/2004 | Chu et al. | |
| 6,782,449 B1 * | 8/2004 | Codilian et al. ............. | 711/113 |
| 7,012,864 B2 | 3/2006 | Tamaru et al. | |
| 7,088,538 B1 * | 8/2006 | Codilian et al. ............... | 360/69 |

* cited by examiner

*Primary Examiner*—Hoa T Nguyen
*Assistant Examiner*—James L Habermehl
(74) *Attorney, Agent, or Firm*—Fellers, Snider, et al.

(57) ABSTRACT

Various embodiments of the present invention are generally directed to using a transducer to transfer data during a transducer displacement operation at a time during such operation when the transducer is substantially stationary.

22 Claims, 3 Drawing Sheets

ANTICIPATORY TRACK SWITCHING

BACKGROUND

The present disclosure is generally directed to data storage, and more particularly to providing anticipatory track switching on a storage media.

Data access (e.g., reading and writing) operations within an electronic data storage device may be random at times. That is, there may be no discernable pattern between the locations on the storage media where a transducer head is to be moved to complete data access operations. However, in other cases the locations on the storage media where the transducer will be moved may be known ahead of time, before a current data access operation is complete.

SUMMARY

Various embodiments of the present invention are generally directed to using a transducer to transfer data during a transducer displacement operation at a time during such operation when the transducer is substantially stationary.

In accordance with some embodiments, a method generally comprises initiating a displacement operation to displace a transducer; and performing a data access operation using the transducer at a time during the displacement operation when the transducer has no appreciable movement.

In accordance with other embodiments, a method generally comprises executing a seek command to displace a transducer, the seek command having at least one latency portion comprising a period of time during execution of the seek command in which the transducer is substantially stationary. The transducer is used to transfer data during the at least one latency portion.

In accordance with other embodiments, an apparatus generally comprises a control circuit which initiates a displacement operation to displace a transducer and which performs a data access operation using the transducer at a time during the displacement operation when the transducer has no appreciable movement.

DETAILED DESCRIPTION

Figure 1:
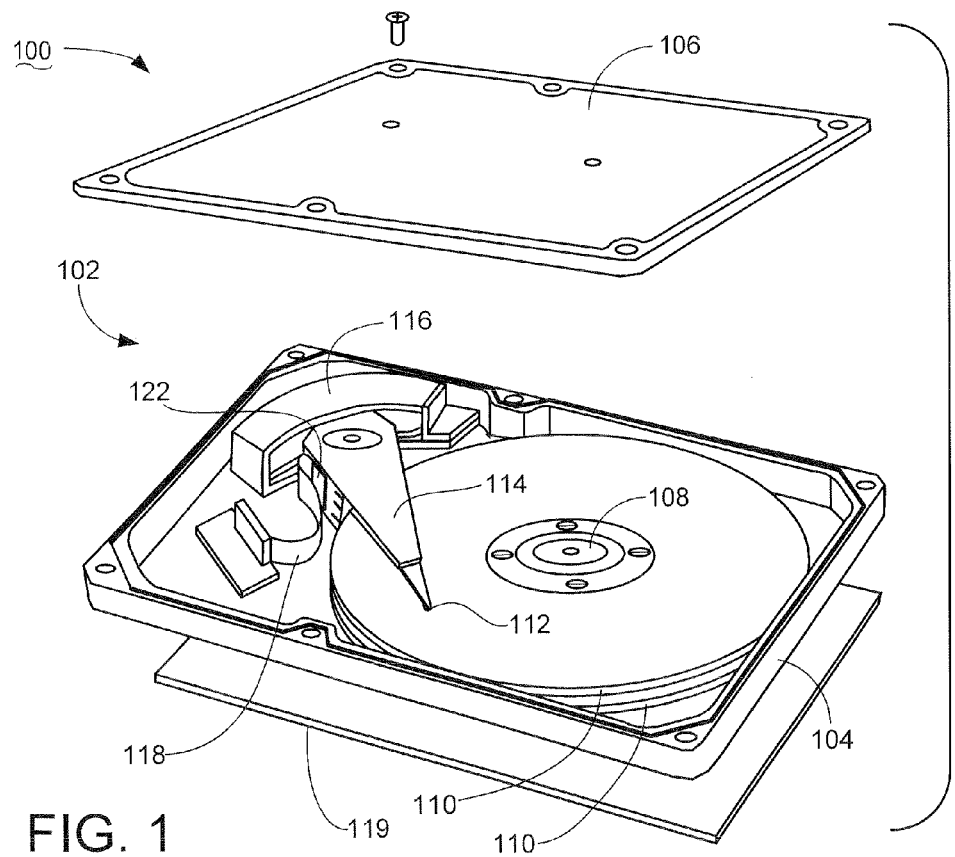
FIG. 1 is an exploded isometric view of an exemplary data storage device in which various embodiments of the present invention can be advantageously practiced.

FIG. 1 provides a top plan view of a data storage device 100. The device 100 is characterized as a hard disc drive and is provided to show an exemplary application in which various embodiments of the present invention may be utilized. It will be understood, however, that the claimed invention is not so limited.

The device 100 includes a housing 102 formed from a base deck 104 and top cover 106. A spindle motor 108 rotates a number of storage media 110 at a constant high speed. The media 110 are accessed by a corresponding array of data transducers 112 supported by a movable actuator 114. The actuator 114 pivots via a voice coil motor 116 to align the transducers 112 with tracks defined on the media surfaces. A flex circuit assembly 118 provides electrical communication paths between the actuator 114 and device control electronics on an externally disposed printed circuit board (PCB) 119.

Figure 2:
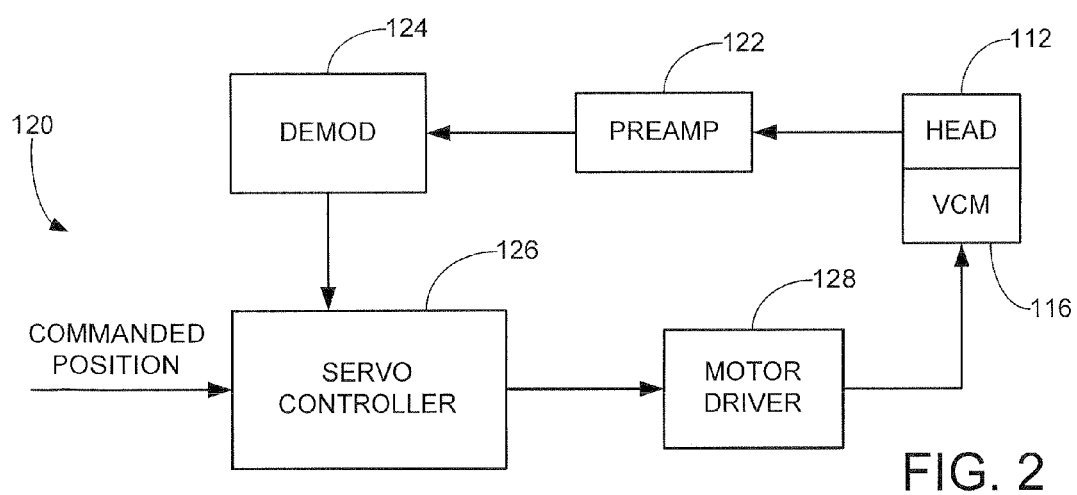
FIG. 2 provides a functional representation of a closed loop servo control circuit of the device of FIG. 1.

FIG. 2 provides a generalized functional block diagram for a closed loop servo control circuit 120 of the device 100. Embedded servo data are transduced from the media 110 by a selected transducer (head) 112 and provided to a preamplifier/driver (preamp) circuit 122.

The preamp circuit 122 preamplifies and filters the readback signals from the transducer 112, and provides the processed servo data to a demodulation (demod) circuit 124. The demod circuit 124 operates to detect and conditions the servo data, including application of automatic gain control (AGC) and conversion of the signals to digital form.

A servo controller 126 processes the digitized servo data to generate a current command signal that is supplied to a motor driver circuit 128. In response, the driver circuit 128 applies the appropriate current to the VCM 116 to position the transducer 112. The servo controller 126 is preferably characterized as a programmable processor with associated servo code to direct the operation of the servo loop, although the servo controller 126, or portions thereof, can alternatively be realized in hardware.

Figure 3:
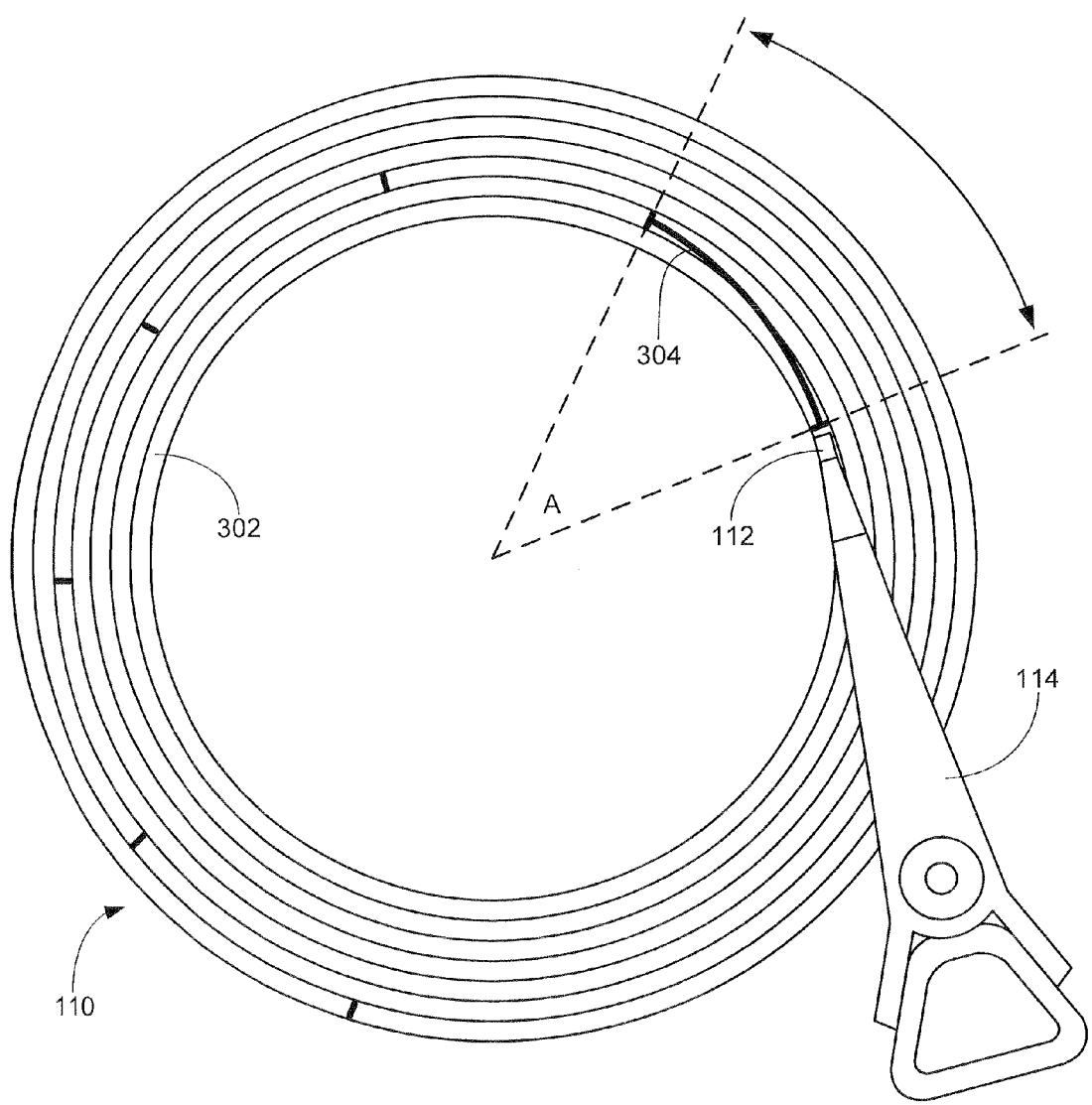
FIG. 3 is an overhead representation of a portion of one of the storage media of FIG. 1.

Referring now to FIG. 3, an overhead simplified representation of portions of a storage medium 110 from FIG. 1. The medium 110 has a number of concentric data tracks generally denoted at 302. While only a handful of tracks 302 are depicted in FIG. 3, it will be understood that the medium 110 is contemplated as comprising many thousands of such tracks across the radial extent thereof.

The actuator 114 is preferably capable of moving the transducer 112 radially to access individual ones of the tracks 302. Illustrated in FIG. 3 is a single track seek wherein the actuator 114 moves the transducer 112 radially from an inner track to an outer track. The positional displacement of the transducer 112 during the seek is generally depicted at 304.

The single track seek does not occur instantaneously, but rather the transducer 112 moves across a portion of the media 110 while the seek is occurring. Preferably, the single track seek will be completed in less than one revolution of the media and thus only a portion of the media 110 will pass under the transducer 112 during a seek period. In the present illustration, the wedge denoted "A", corresponds to the portion of the media 110 passing under the transducer head 112 during the seek.

It is contemplated that, during normal operation of the device 100, cases will arise when a number of sequential track seeks are to be performed. This may be true whether the track seeks progress in a direction from an outer diameter to an inner diameter or from an inner diameter to an outer diameter on the storage media 110. In cases where a series of sequential seeks are contemplated, this information will preferably be available to the servo controller (e.g. 126, FIG. 2) before the seek is actually executed.

Because the upcoming seek destination is known before completion of the current data access operation, seek initialization time can preferably be minimized. Preferably, the transducer and/or servo will never be in a drifting state—that is there are no blind sectors during the initialization period.

Accordingly, a technique referred to herein as an "anticipatory track switch" can be advantageously utilized, as will now be discussed.

Figure 4:
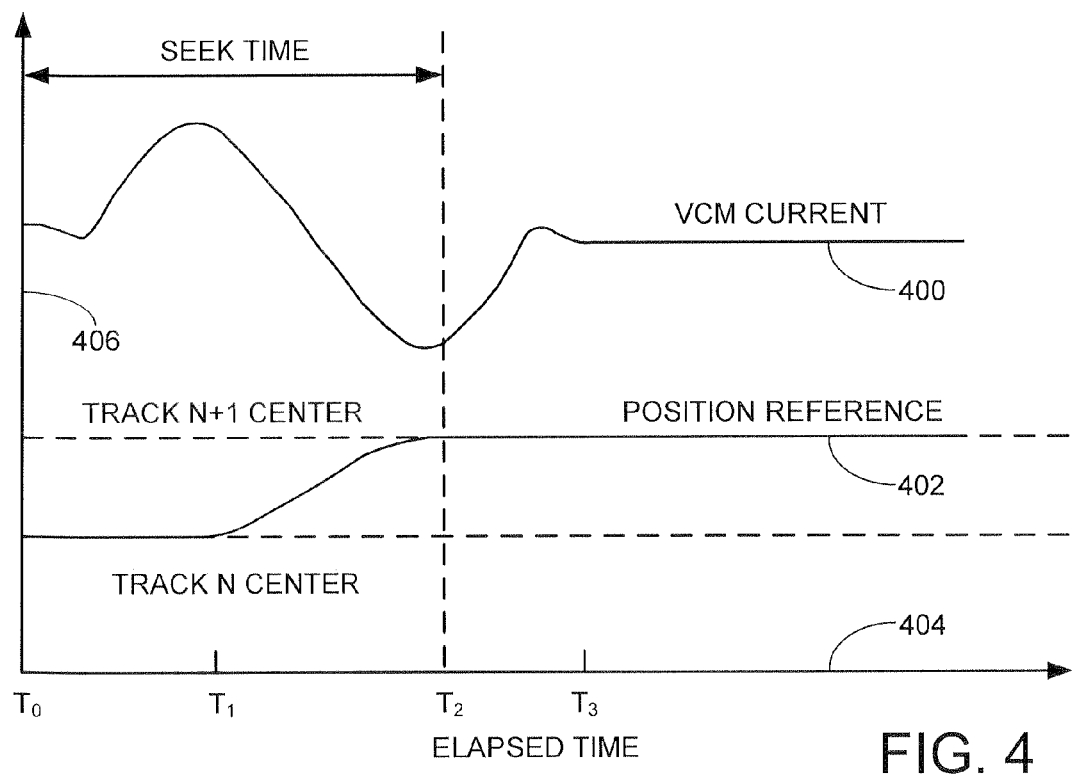
FIG. 4 is an exemplary plot of a voice coil motor current and a position reference signal as a function of time over the domain of an anticipatory track switch carried out in accordance with various embodiments.

FIG. 4 provides an exemplary plot of a voice coil motor (VCM) current 400 and a position reference signal 402 as a function of time over the domain of an anticipatory track switch. The curves 400, 402 are plotted against an elapsed time x-axis 404 and an amplitude y-axis 406.

When a seek (e.g., "track switch") is initiated, a first delay or latency may occur between the time the track switch is commanded and when physical movement of the transducer 112 actually begins. This may be due to latencies or delays in the electronics of the servo controller 126 and/or delays or latencies within the motor driver 128. Furthermore, due to inductive loading and other factors, the VCM 116 does not necessarily respond instantaneously when a current is applied to move the actuator 114 and the transducer 112. That is, there may be a time lag interval between the application of current to the VCM 116 and the initiation of displacement of the transducer 112 from a formerly substantially stationary position.

FIG. 4 illustrates this latency portion as the time interval between execution of the seek (time $T_0$) to the time when the transducer actually begins movement, or displacement (time $T_1$) from a first track N to a second track N+1 (that is, the first latency portion generally comprises the interval from $T_0$ to $T_1$). From FIG. 4 it can be seen that, in addition to delays owing to the electronics such as the servo controller 126 and/or motor driver 128, the transducer 112 remains over the current track for some amount of time even after application of current to the voice coil motor 116.

Following initiation of movement of the transducer 112 (e.g., line 304 in FIG. 3), the current applied to the voice coil motor will cause the displacement of the transducer 112 from the current position to its desired or commanded position. It can be seen in FIG. 4 how the VCM current corresponds in some respects to the position reference, which is here meant to be indicative of the actual location of the transducer 112 over the storage medium 110.

Two track center lines for the tracks N and N+1 are indicated in FIG. 4, and it can be seen as a function of time how the position reference moves from one track center to the next. Preferably, a second latency portion during the seek is provided once the transducer 112 achieves a substantially stationary position over the target track N+1 and prior to the time that the application of seek current is concluded. For reference, this second latency portion is exemplified in FIG. 4 as running from time $T_2$ to $T_3$.

Reading and/or writing operations to the destination track N+1 may commence using the transducer 112 as soon as the transducer 112 has reached the destination track. Preferably, the transducer 112 will reach its new track center as indicated by the position reference 402 prior to the VCM current 400 returning to a zero or nominal value (time $T_3$). However, because the transducer 112 has already arrived at the new track center, there is preferably no need to wait for the VCM current to return to a nominal level before data access operations may resume.

Figure 5:
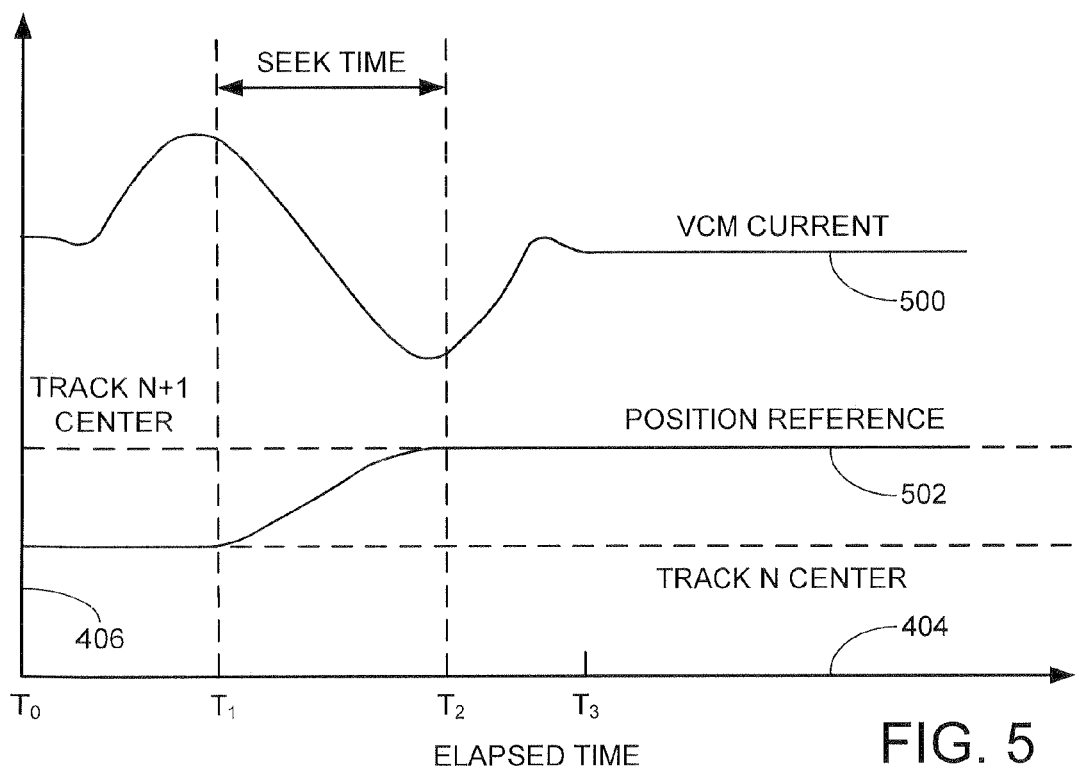
FIG. 5 is a another exemplary plot of a voice coil motor current and a position reference signal as a function of time of time of the domain of an anticipatory track switch carried out in accordance with various embodiments.

Referring now to FIG. 5, another exemplary plot of a voice coil motor current 500 and a position reference signal 502 as a function of time over the domain of an anticipatory track switch is shown.

FIG. 5 is similar to FIG. 4 in that the curves 500, 502 are plotted along the same elapsed time x-axis 404 and amplitude y-axis 406 used in FIG. 4. As before, there is an amount of time following initiation of the current into the voice coil motor wherein the transducer head 112 will stay over the original track center.

Preferably, for some amount of time following issuance of the new command position through the servo controller 126 and even through application of a current to the voice coil motor 116, data access operations such as reading and writing may continue. In other words, the effective overall "seek time" can be viewed as being significantly shortened, as depicted in FIG. 5.

By taking these factors or delays into account, a track switch may preferably be issued "early". That is, in a case where it is known when the current reading and/or writing operations will conclude, a track switching or seek command is preferably executed by servo controller 126 a predetermined period of time prior to the conclusion of a currently ongoing data access operation. The latency or delay between execution of the seek command and actual movement of the transducer head 112 off of the original track centerline preferably remains available for data access commands.

Similarly and as described before, it can be seen in FIG. 5 that the seek time is shortened owing to the fact that the transducer head 112 will arrive at the track center of its commanded position prior to the VCM current returning to zero or a nominal value. Thus, in a preferred embodiment, data access operations can continue on the current track following issuance of the seek command and may resume on the commanded track prior to the actual completion of the seek command (i.e., the end of the application of the seek current, such as depicted at $T_3$).

Allowing for continued data access operations following issuance of a seek command, and allowing data access operations to commence at the target track preferably shortens servo overhead and improves data throughput. One embodiment uses such techniques when dealing with sequential data access operations such as reading, writing, and/or moving large files.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed.

What is claimed is:

1. A method comprising:
    initiating a displacement operation to displace a transducer to a second track from a first track by applying seek current; and
    using the transducer to initiate a data access operation with the second track prior to acquisition of embedded servo data from the second track by the transducer.

2. The method of claim 1 wherein the displacement operation comprises a one-track seek command to move the transducer from the first track to the second track immediately adjacent the first track on a storage medium, wherein the seek command is executed while an ongoing data write operation with the first track is taking place, and wherein the data write operation of the performing step comprises a terminal portion of said ongoing data access operation with the first track so that said ongoing data write operation finishes immediately prior to initiation of movement of the transducer toward the second track.

3. The method of claim 1, wherein the initiating step comprises transferring data to the first track after an application of the seek current to a motor to accelerate the transducer from the first track toward the second track.

4. The method of claim 1, wherein the using step comprises transferring data from to the second track during an application of the seek current to a motor to decelerate the transducer to maintain the transducer over the second track.

5. The method of claim 1, wherein the initiating step comprises an application of the seek current to a motor to displace the transducer to a destination position, wherein a time lag interval exists between said application of current and initiation of movement of the transducer toward the destination position, and wherein the transducer writes data to the first track during said time lag interval.

6. The method of claim 1, wherein the initiating step comprises an application of the seek current to a motor to displace the transducer to a destination position, whereas a time lag interval exists between a former termination of movement of the transducer at the destination position and a latter termination of the application of said current, and wherein the transducer writes data to the second track during said time lag interval.

7. The method of claim 1, wherein the displacement operation moves the transducer from the first track to the second track immediately adjacent the first track on a storage medium through application of a sinusoidal current function to a motor, and wherein the transducer writes data to the second track during the application of said sinusoidal current function.

8. The method of claim 1, wherein the data access operation initiated by the transducer during the using step comprises writing data to the second track.

9. A method comprising:
   executing a seek command to displace a transducer from a first track to a second track on a storage medium; and
   using the transducer to carry out a data access operation with the second track during a latency portion of the seek command and prior to acquisition by the transducer of any servo data embedded on the second track.

10. The method of claim 9, wherein the latency portion comprises a period of time when seek current is being applied to a voice coil motor adapted to displace the transducer.

11. The method of claim 9, wherein the latency portion comprises a latency period of a servo control circuit between successive embedded servo data fields on the second track.

12. The method of claim 9, wherein the latency portion comprises a period of time following displacement of the transducer to the second track but while seek current is still being applied as a result of the execution of the seek command.

13. The method of claim 9, wherein the transducer further writes data to the first track during application of seek current to a motor coupled to the transducer during said execution of the seek command.

14. The method of claim 9, wherein the seek command comprises application of current to a motor to continuously move the transducer from the first track to the second track, and wherein the at least one latency portion comprises an elapsed time lag interval between arrival of the transducer to the destination track and the continued application of said current.

15. The method of claim 9, wherein the first track is immediately adjacent the second track on the storage medium.

16. The method of claim 9, wherein the seek command results in application of a sinusoidal control current to a motor coupled to the transducer to controllably displace the transducer from the first track to the second track.

17. The method of claim 9, wherein the data access operation comprises the writing of data to the second track.

18. An apparatus comprising:
   a control circuit which initiates a displacement operation to displace a transducer from a first track to an adjacent second track on a storage medium and which performs a data access operation, using the transducer, with the second track at a time during the displacement operation when the transducer has no appreciable movement and before the transducer has transducer servo data embedded on the second track.

19. The apparatus of claim 18, further comprising said transducer adjacent a rotatable medium, and wherein the first track is immediately adjacent the second track on the medium.

20. The apparatus of claim 18, wherein the control circuit maintains angular control of the transducer during the displacement operation so that no blind sectors are experienced during the displacement of the transducer to the second track.

21. The apparatus of claim 18, wherein the displacement operation comprises a seek in which current is applied to a motor to continuously move the transducer from an the first track to the second track, and wherein the data write operation is carried out during an elapsed time lag interval after arrival of the transducer to the destination track and during the continued application of said current.

22. The method of claim 18, wherein the data access operation comprises the writing of data to the second track.

\* \* \* \* \*